(12) United States Patent
Rowe

(10) Patent No.: US 7,296,073 B1
(45) Date of Patent: Nov. 13, 2007

(54) MECHANISM TO SURVIVE SERVER FAILURES WHEN USING THE CIFS PROTOCOL

(75) Inventor: Alan Rowe, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 505 days.

(21) Appl. No.: 09/660,824

(22) Filed: Sep. 13, 2000

(51) Int. Cl.
*G06F 15/16* (2006.01)

(52) U.S. Cl. ............................ 709/227; 714/2; 714/4; 714/13; 714/14; 714/15; 714/23; 714/24

(58) Field of Classification Search ........ 709/227–228; 713/1–2, 100; 714/2, 4, 13, 15, 23, 14, 24
See application file for complete search history.

(56) References Cited

U.S. PATENT DOCUMENTS

| | | | |
|---|---|---|---|
| 4,819,159 A | 4/1989 | Shipley et al. | |
| 4,907,150 A | 3/1990 | Arroyo et al. | |
| 4,937,763 A | 6/1990 | Mott | 364/550 |
| 5,001,712 A | 3/1991 | Splett et al. | |
| 5,008,786 A | 4/1991 | Thatte | |
| 5,043,871 A | 8/1991 | Nishigaki et al. | |
| 5,067,099 A | 11/1991 | McCown et al. | 364/550 |
| 5,195,100 A | 3/1993 | Katz et al. | |
| 5,269,022 A * | 12/1993 | Shinjo et al. | 713/2 |
| 5,313,626 A | 5/1994 | Jones et al. | |
| 5,430,729 A | 7/1995 | Rahnema | |
| 5,668,943 A | 9/1997 | Attanasio et al. | |
| 5,812,751 A * | 9/1998 | Ekrot et al. | 714/4 |
| 5,835,953 A | 11/1998 | Ohran | |
| 5,872,966 A * | 2/1999 | Burg | 709/313 |
| 5,963,962 A | 10/1999 | Hitz et al. | |
| 5,996,086 A * | 11/1999 | Delaney et al. | 714/4 |
| 6,044,461 A * | 3/2000 | Agha et al. | 713/1 |
| 6,134,673 A | 10/2000 | Chrabaszcz | |

(Continued)

FOREIGN PATENT DOCUMENTS

DE  694 25 658 T2  8/2000

(Continued)

OTHER PUBLICATIONS

Jeff Tanner, CIFS: Common Internet File System, Feb. 1997, Unix Review, vol. 31, pp. 31-32, 34, 36-41. XP-000783952.

(Continued)

*Primary Examiner*—William Thomson
*Assistant Examiner*—Phuong N. Hoang
(74) *Attorney, Agent, or Firm*—Blakely Sokoloff Taylor & Zafman LLP

(57) ABSTRACT

The invention provides a method and system for re-establishing sessions between a server and its clients following a failure of the server, planned reboot of the server, or takeover by another server. At critical points within a server/client session, state is saved so as to be reliable and consistent. Upon reboot of the system, state is restored using that which was saved; returning the server to its pre-crash state and preserving sessions that were in progress prior to the reboot. Additionally, state saved by a first sever prior to failure or elective shutdown can be transferred to a second server in a takeover configuration also preserving sessions in progress.

44 Claims, 5 Drawing Sheets

U.S. PATENT DOCUMENTS

| | | | |
|---|---|---|---|
| 6,295,611 | B1 | 9/2001 | Connor et al. |
| 6,334,139 | B1 * | 12/2001 | Sakakura .................... 709/202 |
| 6,341,312 | B1 * | 1/2002 | French et al. ............... 709/227 |
| 6,397,345 | B1 * | 5/2002 | Edmonds et al. ............... 714/4 |
| 6,678,741 | B1 * | 1/2004 | Northcutt et al. ........... 709/248 |
| 2002/0002448 | A1 * | 1/2002 | Kampe ........................ 703/22 |
| 2002/0077800 | A1 * | 6/2002 | Kampe ........................ 703/21 |

FOREIGN PATENT DOCUMENTS

| | | |
|---|---|---|
| EP | 0 308 056 A2 | 3/1989 |
| EP | 0537098 | 4/1993 |
| EP | 0 760 503 A1 | 3/1997 |
| EP | 0 702 815 B1 | 8/2000 |
| WO | WO94/29807 A1 | 12/1994 |
| WO | WO99/46680 A1 | 9/1999 |
| WO | WO 00/11553 A1 | 3/2000 |

OTHER PUBLICATIONS

Dave Hitz, James Lau & Michael Malcolm, Network Appliance, Technical Report 3002, Rev. C 3/95, "File System Design for an NFS File Server Appliance", Usenix Winter 1994, San Francisco, CA, 1994 The Usenix Association, Jan. 1994.

David Hitz, "Technical Report TR01: An NFS File Server Appliance", Rev. A 8/93, Network Appliance Corporation, Santa Clara, CA.

Mulqueen, John T., Product Analysis Review. Communications Week, vol. 452, p. 25, May 3, 1993.

John Ousterhout & Fred Douglis, "Beating the I/O Bottleneck: A Case for Log-Structured File Systems", Electrical Engineering and Computer Sciences, UC Berkeley, CA, Oct. 1988.

Network Appliance. Data ONTAP Event Management System, Aug. 10, 2000.

David Simpson, "'Appliances' Take Over File Server Role", Digital News and Review, vol. 11, No. 6, pp. 1-2, Mar. 21, 1994.

TUX 2: Slashdot.com. TUX 2 "The File System That Would Be King", Microsoft Internet Explorer, Oct. 20, 2000.

Steven R. Kleiman et al, "Using NUMA Interconnects For Highly Available Filers", IEEE Micro, 1999, pp. 42-48.

Allan M. Schwartz, DavidHitz, William M. Pitts, "LFS -A Local File System for Multiprocessor NFS Network Servers", Technical Report 4, Auspex, Dec. 1989.

Computer. IEEE. Titan Architectural Review. Sep. 1988.

* cited by examiner

MECHANISM TO SURVIVE SERVER FAILURES WHEN USING THE CIFS PROTOCOL

BACKGROUND OF THE INVENTION

1. Field of the Invention

This invention relates to transparent recovery of server failures and elective reboots while maintaining consistent data using the CIFS Filesystem protocol.

2. Related Art

The Common Internet File system (CIFS) protocol is defined by Microsoft. It enables collaboration on the internet by defining a remote file access protocol that allows applications to share data on local disks and network file servers. CIFS incorporates the same high-performance, multi-user read and write operations, locking, and file-sharing semantics that are the backbone of today's sophisticated enterprise computer networks. With CIFS, users with different platforms and computers can share files without having to install new software.

CIFS generally runs over TCP/IP, and uses the SMB (Server Message Block) protocol found in Microsoft Windows® for file and printer access; therefore, CIFS will allow all PC applications, not just Web browsers, to open and share files across the Internet.

With CIFS, both the client and the server maintain state about filenames, file contents, directories, and various other aspects of the files and directories; thus CIFS is a "stateful" protocol. File content is cached via a cooperative process between client and server code, and this is where problems can occur. The state survives only as long as the session between the server and the client survives, and this session survives only as long as the underlying network connection (generally TCP/IP) survives.

When a server that is currently supporting one or more sessions fails or has to be purposefully rebooted, all sessions being supported are lost. CIFS has no protocol for re-establishment of a session after such a fatal error, or for synchronization of the client/server state to the pre-crash state. CIFS does support fault tolerance in the face of network and server failures where some CIFS clients can restore connections and reopen files that were open prior to interruption, however, any data that was currently being edited that had not been saved is lost. As a result, a server failure is regarded as a catastrophic event in the CIFS world.

Accordingly, it would be advantageous to provide a technique that addresses reestablishing server client sessions that were utilizing CIFS after a server failure or elective reboot so that operation resumes where it ended prior to server unavailability.

SUMMARY OF THE INVENTION

The invention includes a method and system for re-establishing sessions between a server and clients that were using the CIFS protocol. Two types of situations may occur. The first type occurs when a system administrator purposefully reboots the server or a purposeful takeover occurs in a clustered configuration. For these elective reboots of a server a series of tasks are performed; (1) the server stops accepting incoming CIFS requests, (2) the server completes processing of active CIFS requests, (3) all active CIFS state and networking state is captured in non-volatile storage (CIFS data structures are static at this point), (4) the server is rebooted, (5) state is rebuilt for the rebooted machine from that which was saved in non-volatile storage; in a takeover configuration state is made available through transmission or some form of non-uniform memory access, and (6) incoming CIFS requests are once again accepted and operation resumes.

The second type occurs when the server reboots without warning or there is an unplanned takeover due to server failure. These unplanned occurrences require the following tasks be performed; (1) state is saved persistently at predetermined intervals to non-volatile storage, (2) when the system crashes and reboots or is taken over, state is restored from the non-volatile storage, or in a takeover configuration, state is made available through transmission to a subsequent machine or through some form of non-uniform memory access, (3) operations that were in progress resume at the steps they were at prior to the crash, (4) new CIFS requests are now accepted. All of the preceding is transparent to the clients and no data are lost.

DETAILED DESCRIPTION OF THE PREFERRED EMBODIMENT

In the following description, a preferred embodiment of the invention is described with regard to preferred process steps and data structures. Embodiment of the invention can be implemented using general purpose processors or special purpose processors operating under program control, or other circuits, adapted to particular process steps and data structures described herein. Implementation of the process steps and data structures described herein would not require undue experimentation or further investigation.

Lexicography

The following terms refer to or relate to aspects of the invention as described below. The descriptions of general meanings of these terms are not intended to be limiting, only illustrative.

client and server—These terms refer to a relationship between two devices, particularly to their relationship as a client and server, not necessarily to any particular physical devices.

Client device and server device—These terms refer to devices taking on the role of a client device or a server device in a client-server relationship (such as an HTTP web client and web server). There is no particular requirement that any client devices or server devices be individual physical devices. They can each be a single device, a set of cooperating devices, a portion of a device, or some combination thereof.

Procedure—A procedure is a self-consistent sequence of computerized steps that lead to a desired result. These steps are defined by one or more computer instructions. These steps are performed by a computer executing the instructions that define the steps. Thus, the term "procedure" can refer to a sequence of instructions, a sequence of instructions organized in a programmed-procedure or programmed-function, or a sequence of instructions organized within programmed-processes executing in one or more computers.

CIFS—Common Internet File System protocol defines a standard for remote file access using millions of computers at a time across different platforms that can share files.

NetBIOS—An application programming interface (API) that augments the DOS BIOS by adding special functions for local-area networks (LANs).

NBT—An implementation of Netbios over TCP/IP.

SMB—Server Message Block. A message format used by DOS and Windows too share files, directories and devices. NetBIOS is based on the SMB format.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

Figure 1:
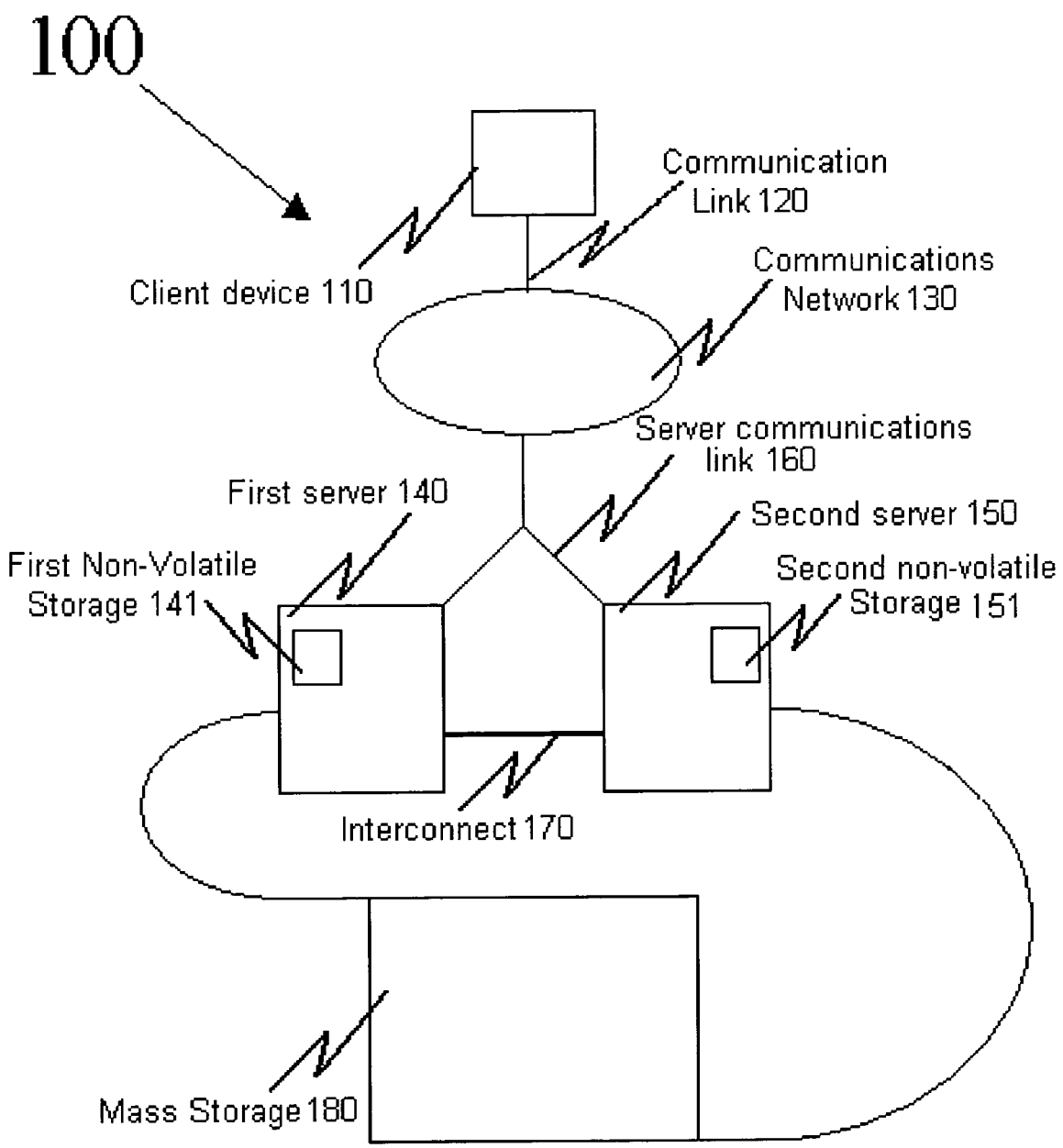
FIG. 1 illustrates a block diagram of a system for server failure survival when using the CIFS protocol.

FIG. 1 shows a block diagram of a mechanism to survive server failures when using the CIFS protocol.

A preferred embodiment of the system 100 can include a client device 110, a client communication link 120, a communications network 130, a first server 140, a second server 150, a server communications link 160, an interconnect 170, and a mass storage 180.

The client device 110 includes a processor, memory, mass storage (not shown but understood by one skilled in the art). Typically, the client device 110 is associated with a user.

The client communication link 120 couples the client device 110 to the communications network 130. In a preferred embodiment, the communications network 130 includes an Internet, intranet, extranet, virtual private network, enterprise network, or another form of communication network.

The first server 140 includes a processor, a main memory (not shown but understood by one skilled in the art), and a first non-volatile storage 141. In a preferred embodiment the first server 130 and the client device 110 are separate devices, however, there is no requirement in any embodiment that they be separate devices. In a preferred embodiment, the first non-volatile storage 141 includes any electronic storage medium capable of retaining state without power or by some auxiliary power source (such as; non-volatile random access memory, magnetic and optical drives).

The second server 150 includes a processor, a main memory (not shown but understood by one skilled in the art), and a second non-volatile storage 151. In a preferred embodiment the second server 150 and the client device 110 are separate devices, however, there is no requirement in any embodiment that they be separate devices. In a preferred embodiment, the first non-volatile storage 151 includes any electronic storage medium capable of retaining state without power or by some auxiliary power source (such as; non-volatile random access memory, magnetic and optical drives).

Additionally, the invention is applicable to both a standalone server and a server cluster; however, the second server 150 is used only in applications of the invention where the functions of the first server 130 are to be taken over by the second server 150. There is no requirement in any embodiment that the second server 150 be present in non-takeover applications of the invention.

A server communications link 160 couples the first server 140 and the second server 150 to the communication network 130.

An interconnect 170 couples the first server 140 to the second server 150 providing bi-directional communication between the two servers.

The mass storage 180 is coupled to both the first server 140 and the second server 150. In a preferred embodiment the mass storage 180 includes magnetic and optical disk arrays, and other devices capable of storing relatively large amounts of data.

Method of Operation—Elective Takeover and Elective Reboot

Figure 2:
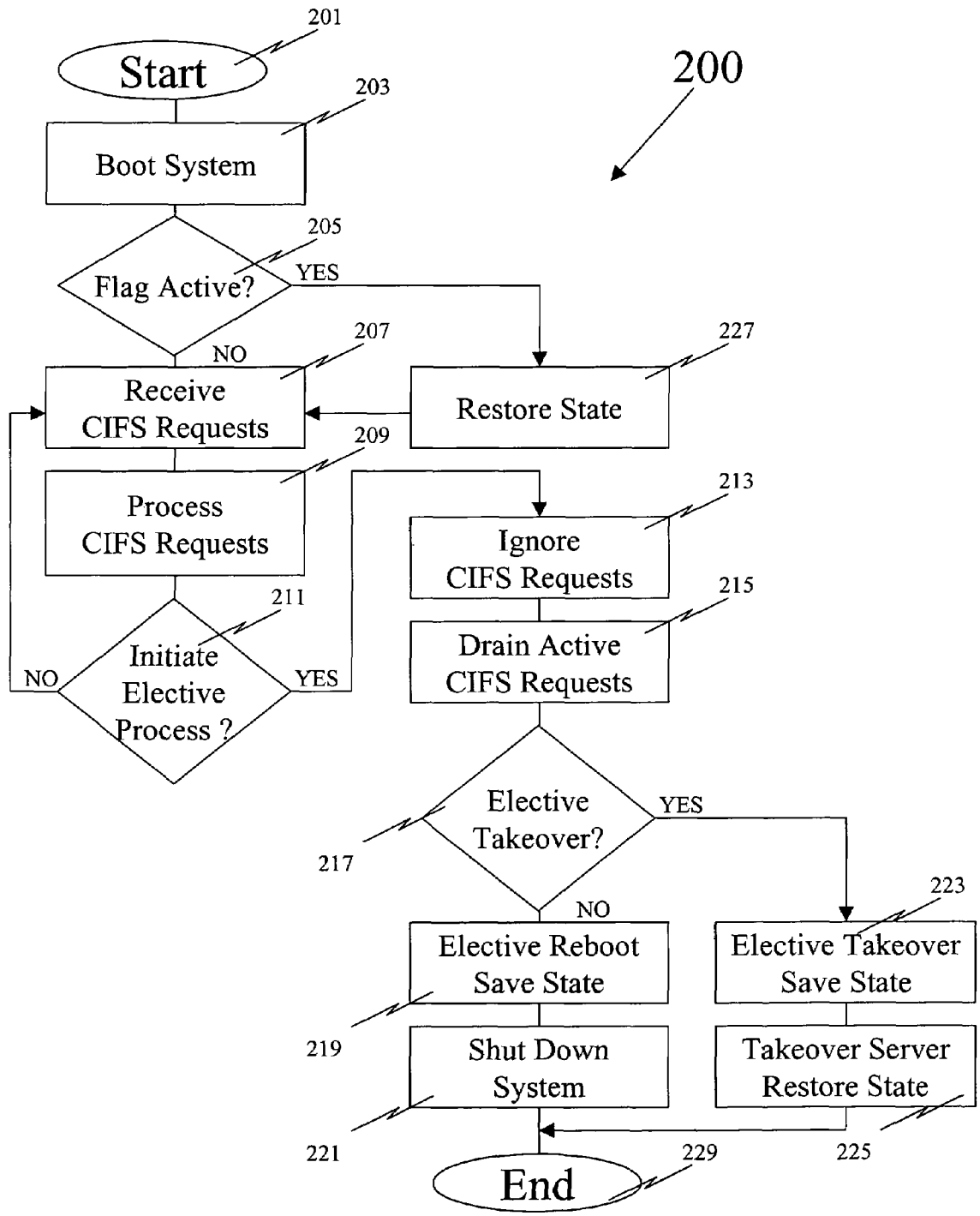
FIG. 2 illustrates a file server elective reboot/takeover process in a system for server failure survival when using the CIFS protocol.

FIG. 2 illustrates a file server elective reboot/takeover process, indicated by general reference character 200. The file server elective reboot/takeover process 200 initiates at a 'start' terminal 201. The file server elective reboot/takeover process 200 continues to a 'boot system' procedure 203 which enables the first server 140 to boot.

A "flag active' decision procedure 205 determines whether the first server 140 is rebooting following an elective reboot. If the 'flag active' decision procedure 205 determines that the first server 140 has been subjected to a reboot, the file server elective reboot/takeover process 200 continues to a 'restore state' procedure 227.

A 'receive CIFS requests' procedure 207 allows user requests to be received by the first server 140.

A 'process CIFS requests' procedure 209 allows the first server 140 to respond to requests from the client device 110 by providing access to data contained in the mass storage 180.

An 'initiate elective process?' procedure 211 determines whether the system is to be purposely taken offline (e.g. by the systems operator for maintenance purposes). If the 'initiate elective process?' procedure 211 determines that an elective shutdown has not been initiated, the file server elective reboot/takeover process 200 continues to the 'receive CIFS requests' procedure 207.

An 'ignore CIFS requests' procedure 213 causes the server device 140 to ignore all incoming CIFS requests from the client device 110. This is perceived by the client device 110 as a network delay and will not by itself terminate the session. The client device 110 will resubmit CIFS requests until accepted or until the session is timed out (approximately 45–60 seconds from receipt of the first rejection by the client device 110) which ever comes first. The invention enables acceptance of CIFS requests prior to a session timing out.

A 'drain CIFS requests' procedure 215 ensures that all currently active CIFS requests are processed to completion.

An 'elective takeover?' decision procedure 217 determines whether an elective takeover has been selected by the systems operator. If the 'elective takeover' decision procedure 217 determines that an elective take over has been selected by the systems operator the file server elective reboot/takeover process 200 continues to an 'elective takeover Save State' procedure' 223.

An 'elective reboot save state' procedure 219 causes the current state of the first server 140 to be stored in the first non-volatile storage 141. This includes the setting of the flag value to indicate a planned reboot of the first server 140.

A 'shut down system' procedure 221 causes the first server 140 to be shut down. The file server elective reboot/takeover process 200 terminates through an "end" terminal 229.

An 'elective takeover save state' procedure 223 causes the current state of the first server 140 to be stored in the first non-volatile storage 141 and the second non-volatile storage 151.

A 'takeover server restore state' procedure 225 allows the state of the first server 140 stored in the first non-volatile storage 141 to be transferred via the interconnect 170 and reconstituted on the second server device 150 or procured from the second non-volatile storage 151. At this point the second server 150 is supporting the sessions that were active on the first server 140 prior to elective takeover and CIFS processing within these sessions continues. The file server elective reboot/takeover process 200 terminates through an "end" terminal 229.

A 'restore state' procedure 227 allows the state of the first server 140 to be reconstituted to the state it was in prior to an elective reboot or non-elective reboot from the state stored in the first non-volatile storage 141. This can include re-establishing the CIFS session that was in progress just prior to the reboot, which can include processing the uncompleted portion of an uncompleted CIFC request. The file server elective reboot/takeover process 200 continues to a 'receive CIFS requests' procedure 207.

Method of Operation—Non-Elective Reboot.

Figure 3:
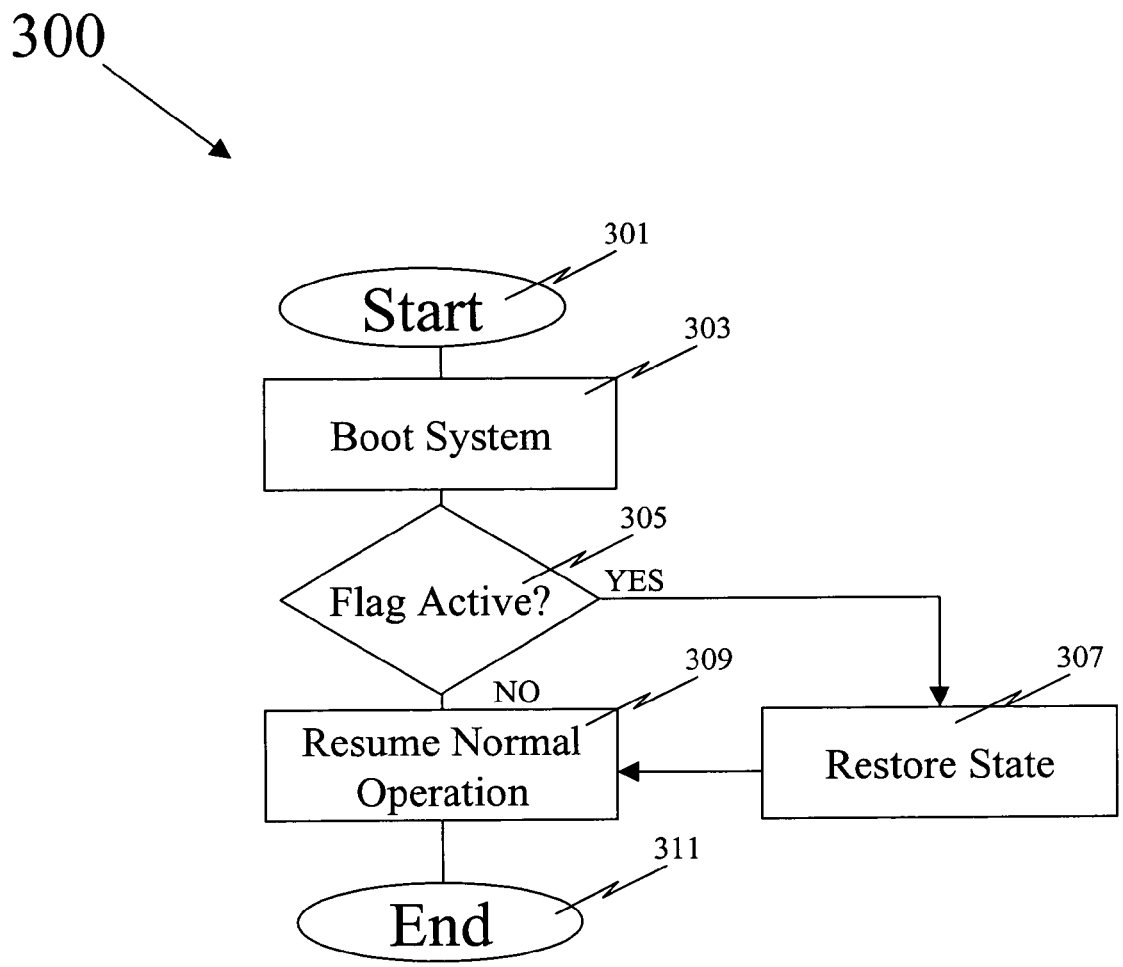
FIG. 3 illustrates a file server non-elective reboot/takeover process in a system for server failure survival when using the CIFS protocol.

FIG. 3 illustrates a file server non-elective reboot process, indicated by general reference character 300. The file server non-elective reboot process 300 initiates at a 'start' terminal 301. The file server non-elective reboot process 300 continues to a 'boot system' procedure 303 which allows the first server 140 to boot.

A "flag active' decision procedure 305 determines whether an non-elective reboot has occurred. If the 'flag active' decision procedure 305 determines that the a non-elective reboot has occurred, the file server non-elective reboot process 300 continues to the 'resume normal operation' procedure 309.

A 'restore state' procedure 307 allows the first server 140 to reconstitute the state it was in prior to the non-elective reboot by copying state from that stored in the first non-volatile storage 141 or second non-volatile storage 151.

A 'resume normal operation' procedure 309 allows the first server 140 to once again accept and process CIFS requests and perform all functions it was executing prior to the non-elective reboot. This can include re-establishing the CIFS session that was in progress just prior to the reboot, which can include processing the uncompleted portion of an uncompleted CIFC request.

The file server non-elective reboot process 300 terminates through an "end" terminal 311.

Method of Operation—Non-Elective Takeover.

Figure 4:
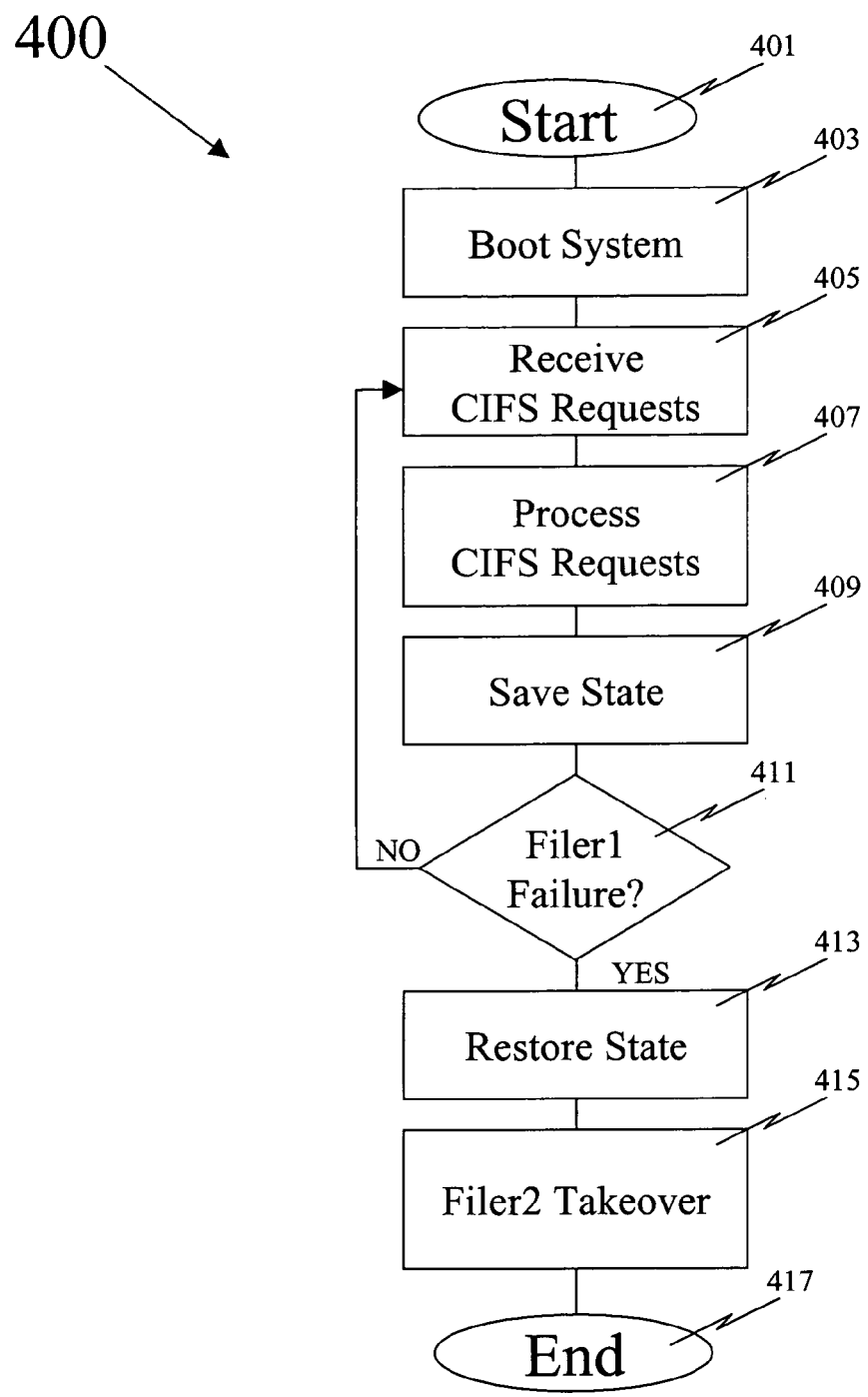
FIG. 4 illustrates a file server non-elective takeover process in a system to survive server failures when using the CIFS protocol.

FIG. 4 illustrates a file server non-elective takeover process, indicated by general reference character 4. The file server non-elective takeover process 400 initiates at a 'start' terminal 401. The file server non-elective takeover process 400 continues to a 'boot system' procedure 403 which allows the first server 140 to boot.

A 'receive CIFS requests' procedure 405 allows user requests to be received by the first server 140.

A 'process CIFS requests' procedure 407 allows the first server 140 to respond to requests from the client device 110 by providing access to data contained in the mass storage 180.

A 'save state' procedure 409 allows the state of the first server 140 to be saved to the first non-volatile storage 141 and the second non-volatile storage 151. In a preferred embodiment, reliably state saving in anticipation of a system failure may be performed at any one of a plurality of specific points within the processing of CIFS requests. For clarity in the description of this method of operation, 'save state' procedure 409 is indicated only once. The specific points for saving state are further discussed within this application.

A 'filer1 failure' decision procedure 411 determines whether the first server 140 has failed in some way. In a preferred embodiment, failure of the first server 140 would be detected by the second server 150. If the 'filer1 failure' decision procedure 411 determines that the first server 140 has not failed, the file server non-elective takeover process 400 continues to the 'receive CIFS requests' procedure 405.

A 'restore state' procedure 413 allows the state of the First server 140 prior to failure to be reconstitute on the second server 150 by copying state from that stored in the first non-volatile storage 141 or second non-volatile storage 151.

A 'filer2 takeover' procedure 415 completes the process by allowing the second filer 150 to resume processing of CIFS request where the first server 140 stopped. This includes re-establishing the CIFS session that was in progress when the first server 140 failed, which can include processing the uncompleted portion of an uncompleted CIFC request.

The file server non-elective takeover process 400 terminates through an "end" terminal 417.

Method of Operation—Automatic State Saving

Figure 5:
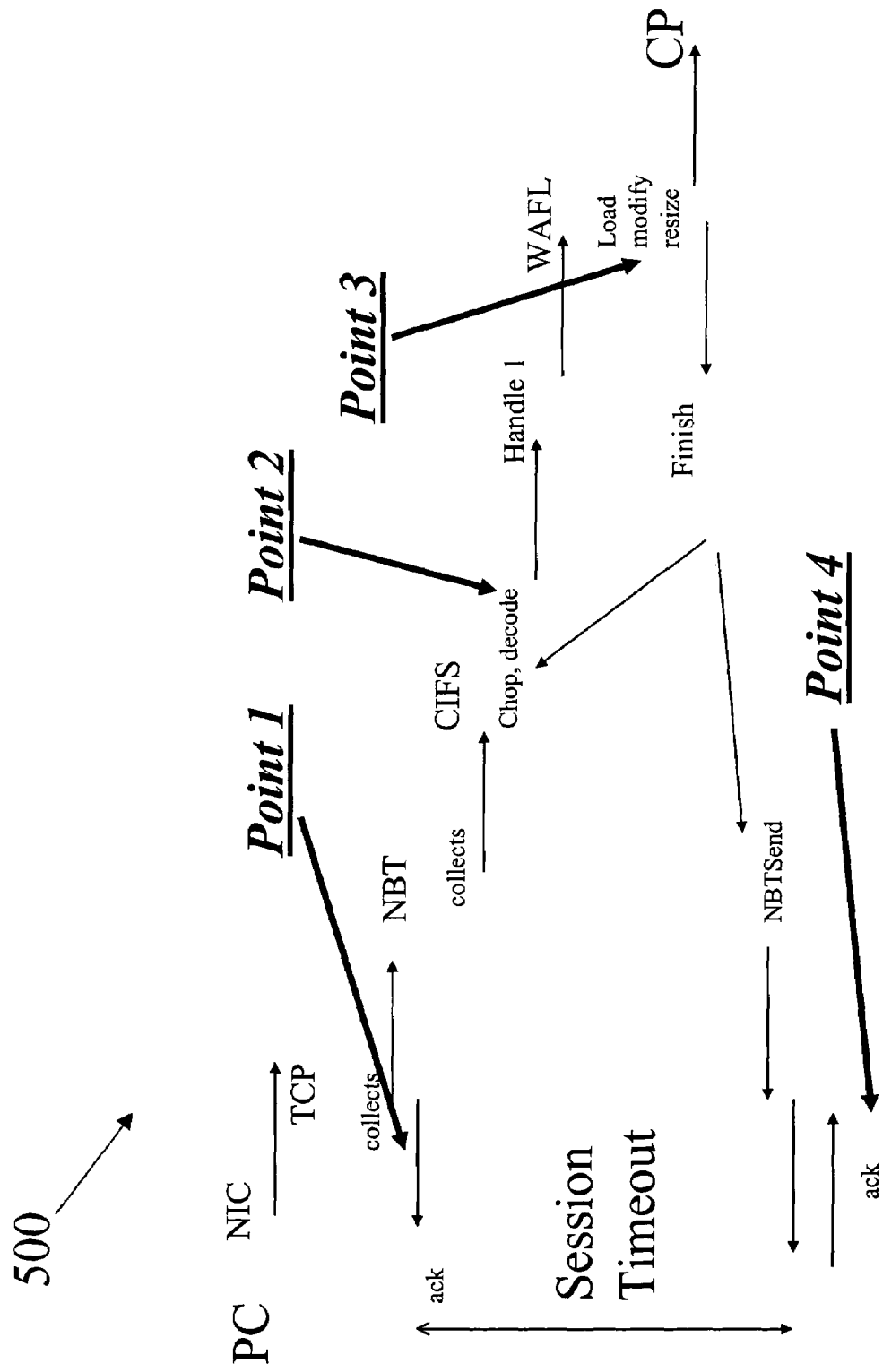
FIG. 5 illustrates critical state saving points in a mechanism to survive server failures when using the CIFS protocol.

FIG. 5 illustrates critical state saving points in a mechanism to survive server failures when using the CIFS protocol.

The saved state must always be in a consistent state. Automatic state saving must occur at specified points within a session of communication between the first server 140 and the client device 110 to ensure that the saved state is consistent.

POINT 1: State is saved prior to TCP acknowledging an incoming CIFS request. If the system fails prior to this, then the effect is as if the packet was never received, and retransmission by the client device 110 occurs. If the system fails after the acknowledgment is sent, then the system has a record that the request came in and it will be processed when state is restored.

POINT 2: State is saved prior to CIFS starting a SMB command. If the system fails prior to this, TCP will redeliver the TCP message to CIFS. If the system fails after this, the saved state indicates that the first server 140 started work on a CIFS operation. (Some single CIFS commands are composite operations: e.g. open, read, and close. In such cases, saving state is required before each component operation).

POINT 3: State is saved when a CIFS operation completes. If the system fails prior to this, the same CIFS operation is repeated creating the same result. If the system fails after this, the reply is sent again and TCP treats it as a duplicate.

POINT 4: State is saved after TCP acknowledges the reply. If the system fails prior to this, then the reply never happened and will be sent again. If the system fails after the acknowledgment but before the acknowledgment is saved, then we will duplicate the acknowledgment and normal TCP handling will process that without any problems. If the system fails after the save has occurred the acknowledgment will not be repeated.

These four points illustrate where state may be saved in a consistent manner, however, there are other points where state may be reliably saved and these points would be obvious to one skilled in the art.

GENERALITY OF THE INVENTION

The invention has general applicability to various fields of use, not necessarily related to the services described above. For example, these fields of use can include one or more of, or some combination of, the following:

In addition to general applicability to CIFS the invention has broad applicability to other transmission protocols.

Other and further applications of the invention, in its most general form, will be clear to those skilled in the art after perusal of this application, and are within the scope and spirit of the invention.

ALTERNATE EMBODIMENTS

Although preferred embodiments are disclosed herein, many variations are possible which remain within the concept, scope, and spirit of the invention, and these variations would become clear to those skilled in the art after perusal of this application.

The invention claimed is:

1. A method of operating a file server, comprising the steps of:
   receiving a network request at said file server from a client device, wherein the network request is part of a network session;
   recording a state of said file server transparently to said client device, after receiving the request and prior to an offlining of the file server;
   determining whether a recovery of said file server after said offlining is to be accomplished by rebooting said file server or by takeover by another server;
   restoring said state of said file server upon a reboot of said file server or upon a takeover by said other server, transparently to said client device; and
   continuing the network session with said client device after restoring said state.

2. The method of claim 1, wherein said step of receiving a network request includes the steps of
   acknowledging receipt of said network request; and
   processing said network request.

3. The method of claim 1, wherein said step of recording state includes determining automatically whether the processing of the network request is at a point where said state can be reliably recorded.

4. The method of claim 3, wherein said step of recording state occurs at points based on progress of processing of the network request.

5. The method of claim 4, wherein said state is recorded to a non-volatile storage.

6. The method of claim 1, wherein said step of recording state at said file server occurs as part of an elective reboot or elective takeover of a server, the method further comprising:
   ignoring current network requests and
   processing all active network requests,
   prior to recording said state.

7. The method of claim 6, wherein all currently active requests are processed to completion.

8. The method of claim 1, wherein said step of recording state further comprises the step of determining whether a prior shutdown of said file server was elective or non-elective.

9. The method of claim 8, wherein said step of determining whether a prior shutdown of said file server was elective or non-elective is a function of a flag value stored in a non-volatile storage.

10. The method of claim 9, wherein said flag value indicates said server shutdown was elective.

11. The method of claim 9, wherein said flag value indicates said server shutdown was non-elective.

12. The method of claim 1, wherein said step of determining whether recovery is to be accomplished by rebooting the server or takeover by another server is a function of a flag value stored in a non-volatile storage.

13. The method of claim 12, wherein said flag value indicates said recovery is to be accomplished by rebooting the server.

14. The method of claim 12, wherein said flag value indicates said recovery is to be accomplished by takeover by another server.

15. The method of claim 1, wherein said step of restoring state further comprises determining whether recovery is by reboot or takeover by another server.

16. The method of claim 15, wherein said step of determining whether recovery is accomplished by reboot or takeover by another server is a function of said flag value stored in a non-volatile storage.

17. The method of claim 16, wherein said reboot comprises:
   rebooting an operating system of the file server; and
   rebuilding in-memory data structures to the state prior to said reboot.

18. The method of claim 17, wherein said rebuilding in-memory data structures further comprises fetching the state stored in said non-volatile storage to rebuild said in-memory data structures.

19. The method of claim 16, wherein said takeover comprises fetching the state stored in the non-volatile storage and rebuilding said in-memory data structures in another server using said state.

20. The method of claim 1, wherein said step of attempting to continue the network session further comprises processing an uncompleted portion of the request.

21. The method of claim 1, wherein the network session is a CIFS session.

22. An apparatus including:
   means for receiving a Common Internet File System (CIFS) request at a file server from a client device, wherein the CIFS request is part of a CIFS session; and
   means for recording a state at said file server transparently to said client device, after receiving the request and prior to an offlining of the file server;
   means for determining whether a recovery of said file server after said offlining is to be accomplished by rebooting said file server or by takeover by another server;
   means for restoring said file server to said state as recorded, upon a reboot of said file server or upon a takeover by said other server, transparently to said client device; and
   means for continuing the CIFS session with said client device after restoring said state.

23. The apparatus of claim 22, wherein said means for receiving a CIFS request includes means for acknowledging receipt of said CIFS request and means for processing the request.

24. The apparatus of claim 22, wherein said means for recording state includes means for determining automatically whether the processing of a CIFS request is at a point where said state can be reliably recorded.

25. The apparatus of claim 24, wherein said recording state occurs at points based on the progress of processing of a CIFS request.

26. The apparatus of claim 25, wherein said state is recorded to a non-volatile storage.

27. The apparatus of claim 22, wherein said recording said state at said file server occurs as part of an elective reboot or elective takeover of a server, the apparatus further comprising:
means for ignoring current CIFS requests; and
means for processing all active CIFS requests.

28. The apparatus of claim 27, wherein all currently active requests are processed to completion.

29. The apparatus of claim 22, wherein said means for recording state further comprises means for determining whether a prior server shutdown was elective or non-elective.

30. The apparatus of claim 29, wherein said means for determining whether said prior server shutdown was elective or non-elective is a function of a flag value stored in said non-volatile storage.

31. The apparatus of claim 30, wherein said flag value indicates said prior server shutdown was elective.

32. The apparatus of claim 30, wherein said flag value indicates said prior server shutdown was non-elective.

33. The apparatus of claim 22, wherein said means for determining whether recovery is to be accomplished by rebooting the server or takeover by another server is a function of a flag value stored in a non-volatile storage.

34. The apparatus of claim 33, wherein said flag value indicates said recovery is to be accomplished by rebooting the server.

35. The apparatus of claim 33, wherein said flag value indicates said recovery is to be accomplished by takeover by another server.

36. The apparatus of claim 22, wherein said means for determining whether said recovery is to be by reboot or takeover by another server is a function of a flag value stored in a non-volatile storage.

37. The apparatus of claim 36, wherein said reboot comprises:
rebooting an operating system of the server; and
rebuilding in-memory data structures to the state prior to said reboot.

38. The apparatus of claim 37, wherein said means for rebuilding in-memory data structures further comprises means for fetching the state stored in said non-volatile storage to rebuild said in-memory data structures.

39. The apparatus of claim 36, wherein said takeover comprises fetching the state stored in said non-volatile storage and rebuilding said in-memory data structures in another server using said state.

40. The apparatus of claim 22, wherein said means for attempting to continue the CIFS session further comprises means for processing the remaining portion of the uncompleted request.

41. A method of operating a storage server, the method comprising:
receiving a Common Internet File System (CIFS) request at said storage server from a client device during a CIFS session;
determining whether an elective offlining process of said storage server has been initiated;
in response to determining that an elective offlining process of said storage server has been initiated, then prior to an elective offlining of said storage server,
ignoring further incoming CIFS requests from said client device,
completing currently active CIFS requests,
determining whether a recovery of said storage server after said elective offlining is to be accomplished by rebooting said storage server or by takeover by another server, and
recording a state of said storage server in a non-volatile storage medium transparently to said client device, in a manner which depends on whether said recovery is to be accomplished by rebooting said storage server or by takeover by another server;
restoring said state of said storage server from said non-volatile storage medium during said recovery, transparently to said client device; and
continuing the CIFS session with said client device after restoring said state.

42. The method of claim 41, wherein said recording state comprises determining automatically whether processing of the CIFS request is at a point where said stat can be reliably recorded.

43. The method of claim 42, wherein said recording state occurs at points based on progress of processing of the CIFS request.

44. The method of claim 41, wherein said determining whether recovery is to be accomplished by rebooting said server or takeover by another server is a function of a flag value stored in the non-volatile storage medium.

* * * * *